US008075664B1

(12) United States Patent
Wang et al.

(10) Patent No.: US 8,075,664 B1
(45) Date of Patent: Dec. 13, 2011

(54) SYNTHESIS OF METALLIC NANOSHELLS ON PORPHYRIN-STABILIZED EMULSIONS

(75) Inventors: Haorong Wang, Albuquerque, NM (US); Yujiang Song, Albuquerque, NM (US); John A. Shelnutt, Tijeras, NM (US); Craig J. Medforth, Winters, CA (US)

(73) Assignee: Sandia Corporation, Albuquerque, NM (US)

( * ) Notice: Subject to any disclaimer, the term of this patent is extended or adjusted under 35 U.S.C. 154(b) by 1056 days.

(21) Appl. No.: 11/760,850

(22) Filed: Jun. 11, 2007

(51) Int. Cl.
*C22B 5/20* (2006.01)
(52) U.S. Cl. ............................. 75/370; 75/252
(58) Field of Classification Search .................... 75/370, 75/252
See application file for complete search history.

(56) References Cited

U.S. PATENT DOCUMENTS

| 7,374,599 B1 * | 5/2008 | Shelnutt et al. | 75/370 |
| 7,704,489 B1 * | 4/2010 | Shelnutt et al. | 424/9.61 |

OTHER PUBLICATIONS

NPL: Tartaj et al, The preparation of Magnetic nanoparticles for applications in biomedicine, J. Phys. D: Appl. Phys., vol. 36 (2003) R182-R197.*

Sang-Wook Kim et al, "Fabrication of Hollow Palladium Spheres and Their Successful Application to Recyclable Heterogeneous Catalyst for Suzuki Coupling Reactions", Journal of American Chemical Society, Communications, vol. 124, No. 26, 2002, pp. 7642-7643.
Rajiv Kumar et al, "Hollow gold nanoparticles encapsulating horseradish peroxidase", Elsevier, Biomaterials, vol. 26, 2005, pp. 6743-6753.
Han-Pu Liang et al, "Pt Hollow Nanospheres: Facile Synthesis and Enhanced Electrocatalysts," Angew. Chem. Int. Ed. 2004, vol. 43, pp. 1540-1543.
S. Schacht et al, "Oil-Water Interface Templating of Mesoporous Macroscale Structures", Science, vol. 273, 1996, pp. 771.
Yujiang Song et al, "Controlled Synthesis of 2-D and 3-D Dendritic Platinum Nanostructures", J Journal of American Chemical Society, Articles, 2004, vol. 126, pp. 635-645.
Yugang Sun, "Template-Engaged Replacement Reaction: A One-Step Approach to the Large-Scale Synthesis of Metal Nanostructures with Hollow Interiors", American Chemical Society, 2002 Nano Letters, vol. 2 No. 5, pp. 481-485.
U.S. Appl. No. 10/887,535, filed Jul. 8, 2004.

* cited by examiner

*Primary Examiner* — Jie Yang
(74) *Attorney, Agent, or Firm* — Carol I. Ashby

(57) ABSTRACT

Metal nanostructures formed by photocatalytic interfacial synthesis using a porphyrin-stabilized emulsion template and the method for making the nanostructures. Catalyst-seeded emulsion droplets are employed as templates for hollow-nanoshell growth. The hollow metal nanospheres may be formed with or without inclusions of other materials.

12 Claims, 4 Drawing Sheets

SYNTHESIS OF METALLIC NANOSHELLS ON PORPHYRIN-STABILIZED EMULSIONS

The United States Government has rights in this invention pursuant to Department of Energy Contract No. DE-AC04-94AL85000 with Sandia Corporation.

BACKGROUND OF THE INVENTION

This invention relates to metallic hollow metallic nanostructures and microstructures. Microstructures and nanostructures having hollow interiors, for example, nanoshells, have many potential applications because of their increased surface areas, low density, low material cost, and sometimes special optical properties. Most previous nanoshell and microshell structures have been synthesized using multiple bottom-up processes by coating a hard core template followed by removing the core template through etching. For example, Kim et al. have synthesized palladium hollow spheres using silica spheres as a template (S.-W. Kim, M. Kim, W. Y. Lee, and T. Hyeon, "Fabrication of Hollow Palladium spheres and Their Successful Applications to the Recyclable Heterogeneous Catalyst for Suzuki Coupling Reactions," J. Amer. Chem. Soc. Vol. 124 (2002) pp. 7642-7643). The surfaces of the silica spheres were functionalized with mercaptopropylsilyl (MPS) groups. The palladium precursor, palladium acetylacetonate, was then adsorbed onto the surfaces of the MPS-functionalized silica spheres. The $Pd^{2+}$-adsorbed-MPS-functionalized silica spheres were heated at 250 C for 3 hours to obtain Pd metal-coated spheres. The silica sphere was removed by HF etching.

Hollow nanoshells of gold have been prepared by leaching out silver chloride from $Au_{shell}/(AgCl+horseradish\ peroxidase)_{core}$ nanoparticles with dilute ammonia solution (R. Kumar, A. N. Maitra, P. K. Patanjali, and P. Sharma, "Hollow gold nanoparticles encapsulating horseradish peroxidase," Biomaterials, vol. 26 (2005), pp. 6743-6753).

Galvanic replacement processes where a sacrificial metal template is used have also been reported. Reaction of $Pd(NO_2)_2$ or $Pt(CH_3COO)_2$ with Ag nanocrystal templates has produced Pd and Pt nanoshells (Y. Sun, B. T. Mayers, and Y. Xia, "Template-Engaged Replacement Reaction: A One-Step Approach to the Large-Scale synthesis of Metal Nanostructures with Hollow Interiors," Nano Letters vol. 2 (002) pp. 481-485). The shape of the nanocrystal template is reproduced in the nanoshell structure. Liang et al. have synthesized Pt hollow nanospheres by exploiting the replacement reaction between Co nanoparticles and $H_2PtCl_6$ (H.-P. Liang, H.-H. Zhang, J.-S. Hu, Y.-G. Guo, L.-J Wan, and C.-L. Bai, "Pt Hollow Nanospheres: Facile Synthesis and Enhanced Electrocatalysts," Angew. Chem. Int. Ed. Vol. 43 (2004) pp. 1540-1543). Co nanoparticles are oxidized to cobalt ions when the solution of Co nanoparticles is added to a $H_2PtI_6$ solution. The reaction continues until the Co is completely consumed. The Pt shell is incomplete and porous.

Emulsion droplets have been used as coating templates for synthesis of hollow spheres of oxides and semiconductors. These previous emulsion-based methods did not employ photocatalytic interfacial synthesis of metallic nanoshells or microshells using a porphyrin-stabilized emulsion template.

Schacht et al. have combined long-range oil-in-water emulsion and oil-in-water interface physics with the shorter range cooperative assembly of silica and surfactants at the oil-water interface to create ordered composite mesostructured phases that are also macroscopically structured (S. Sachact, Q. Huo, I. G. Voign-Martin, G. D. Stucky, and F. Schuth, "Oil-Water Interface Templating of Mesoporous Macroscale Structures," Science, Vol. 272, (1996) pp. 768-771).

A related patent application that does not employ emulsions to form shells is John A. Shelnutt, Yujiang Song, Eulalia F. Pereira, and Craig J. Medforth, "Dendritic Metal Nanostructures," U.S. patent application Ser. No. 10/887,535 filed Jul. 8, 2004. It is incorporated herein by reference.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises metal nanostructures formed by photocatalytic interfacial synthesis using a porphyrin-stabilized emulsion template and the method for making the nanostructures. Catalyst-seeded emulsion droplets are employed as templates for hollow-nanoshell growth. The hollow metal nanospheres may be formed with or without inclusions of other materials.

Figure 1:
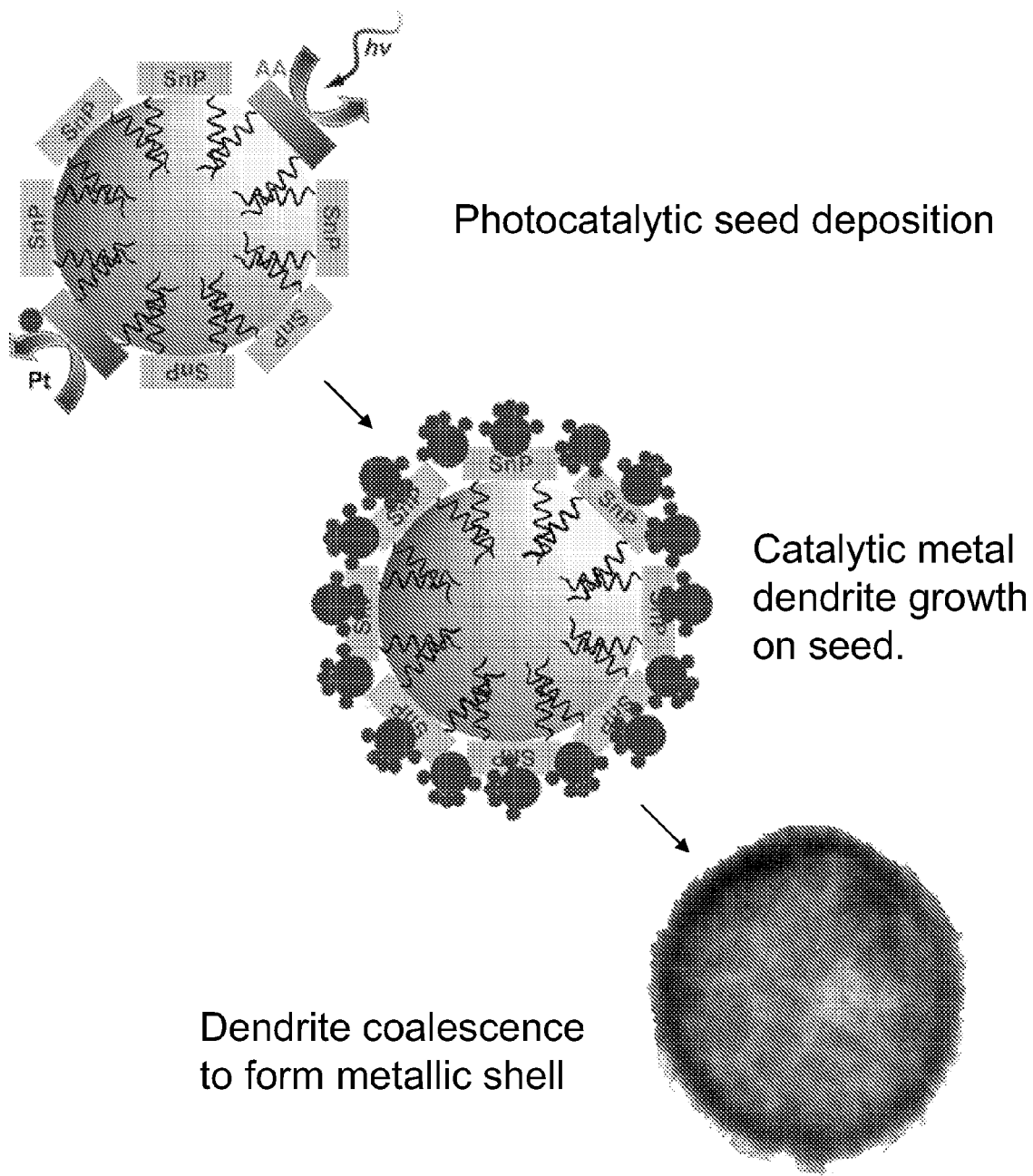
FIG. 1 presents a schematic representation of one mechanism for formation of metal nanoshells at the surface of the porphyrin-stabilized dispersed phase of an emulsion.
Figure 2:
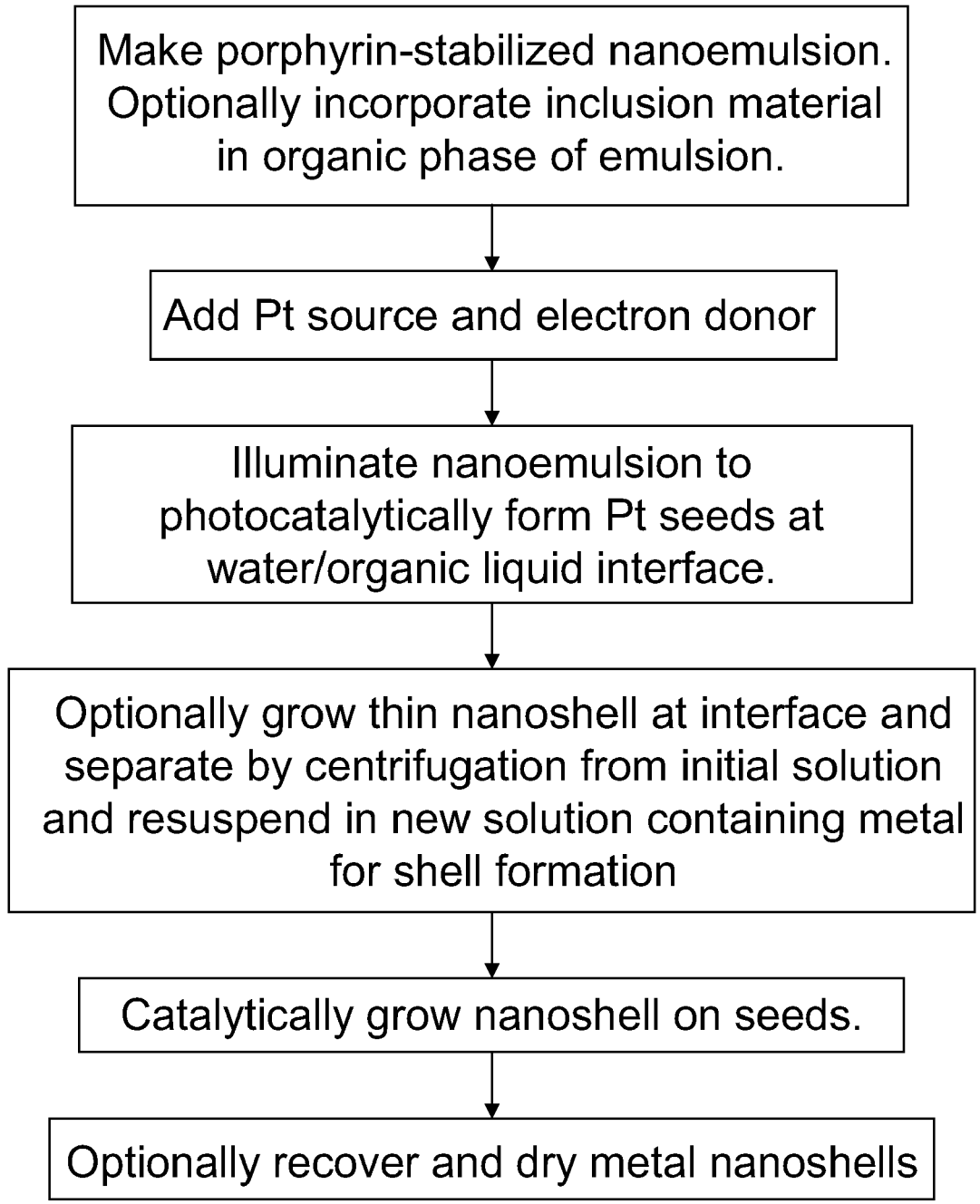
FIG. 2 illustrates one embodiment of a method for forming metal nanoshells using Pt as the seed metal and Pt or Pd as the shell metal.

Embodiments of this invention are based on a photocatalytic reduction of metal ions at the interface between the dispersed and continuous phases of an emulsion. The metal reduction is photocatalyzed by a metallo-lipoporphyrin that resides at the water/organic liquid (oil) interface and can function as a surfactant that stabilizes the emulsion and as a photocatalyst. The photocatalytic reduction of metal ions produces a surface distribution of catalytic metal seed particles. Subsequent growth of a metallic sphere at the surface can be autocatalytically or photocatalytically promoted. FIG. 1 illustrates an embodiment of the invention. The size of the shell is controlled by the size of the emulsion droplet and the wall thickness is controlled by both the metal ion availability and the oil droplet concentrations. An inclusion particle may be incorporated within the shell. A process flowchart is presented for one embodiment in FIG. 2.

The lipoporphyrin has both hydrophobic and hydrophilic characteristics. Consequently, the lipoporphyrin resides at the oil/water interface of the emulsion droplet. Metal nanoshells or microshells are formed at this interface by reactions that are photocatalyzed and/or autocatalyzed after photocatalytic seed-metal production. For this invention, the term nanoshell is defined to include shell diameters ranging up to approximately 10 micrometers. The size distribution of the shells is determined by the size distribution of the droplets of the emulsion. As the volume ratio of the organic-liquid component of the emulsion is reduced, the average size of the metal shells is decreased. For example, in embodiments involving benzene, the emulsion before irradiation is observed to turn from yellow-milky to yellow-transparent when it is diluted to 0.25 vol. % or lower. At volume ratios below 0.25%, most of the micron size droplets are gone and the emulsion becomes a nanoemulsion, which appears transparent. The stabilizing effects of the lipoporphyrin at the oil-water interface allows the continuing presence of the nanodroplets at volume ratios well below the normal solubility limit of benzene in water. The organic phase does not diffuse totally into the water phase, and the emulsion is sufficiently stable to survive the metal-growing period. A variety of organic liquids may be used as the dispersed phase. The oils phase should be able to solubilize the hydrophobic substituents of the photocatalytic porphyrin. Examples of suitable organic liquids include but are not restricted to benzene, chloroform, and dichloromethane, and other organic solvents with appropriate solubility in water to allow stable nanoemulsion formation. Embodiments have been demonstrated using benzene, chloroform, and dichloromethane. Platinum nanoshells have been prepared using a 2 vol. % dichloromethane (containing 1 mM SnP18)-in-water emulsion and using a 0.5 vol. % chloroform (containing 1 mM SnP18)-in-water emulsion. Other polar solvents which can form the emulsion and dissolve a sufficient amount of the lipoporphyrin to provide a sufficient concentration in the interface to catalyze the reduction may be used. The photocatalytic porphyrin comprises a hydrophilic head and a hydrophobic tail, as discussed below.

The sizes of droplets in the emulsion will determine the sizes of the nanoshells. Increasing the volume fraction of the organic liquid will increase the size of the metal nanoshells. For example, in an embodiment employing 0.5 vol. % benzene in water, the product consisted of hollow platinum structures with a range of sizes and morphologies and with a significant quantity of micron-sized structures present. At 0.25 vol. % benzene, relatively few micron-sized shells are observed in scanning electron micrographs (SEMS) and most of the product consisted of spherical Pt shells between 100 and 400 nm in diameter. With 0.125 vol. % benzene, the size of the nanoshells was further reduced and most of the product consisted of nanoshells between 50 and 150 nm in diameter. Good reproducibility was obtained for the emulsions prepared with benzene concentrations below approximately 0.22 vol. %.

In some embodiments, Sn(IV) meso-tetra(N-octadecyl-4-pyridyl)porphyrin (SnP18) was dissolved in dichloromethane or chloroform or suspended in benzene using mild sonication. The concentration of SnP18 in the organic liquid as described herein is calculated based on the SnP18 amount in the organic liquid regardless of whether the SnP18 is dissolved or suspended. An oil-in-water emulsion was prepared by injecting 0.02 mL of SnP18-containing organic liquid into 2 mL of water followed by mild sonication for approximately 2 minutes to produce a 1 vol. % emulsion. A transparent yellow solution was produced when dichloromethane was used as the organic (oil) phase because the oil-phase volume ratio was very close to its solubility in water (2 vol. %). For chloroform and benzene, a milky yellow emulsion was produced (solubility in water is 0.5 vol. % for chloroform and 0.22 vol. % for benzene). The freshly prepared emulsion was further diluted using distilled water to a desired volume ratio. When the emulsion was diluted to a volume ratio near the solubility of the organic phase, the emulsion became transparent.

In forming the emulsion, it is desirable to achieve a thermodynamically stable or metastable state. This is facilitated by the organic liquid being slightly soluble water. To make microemulsions or nanoemulsions from thermodynamically unstable macroemulsions, a dilution technique is useful in some embodiments where the initial organic concentration does not produce the stable or metastable transparent microemulsion or nanoemulsion. Following formation of the macroemulsion using standard techniques, such as sonication, forcing the oil/water mixture through an ultrafine mesh at high pressure, and other methods of mixing, dilution by addition of water until the organic liquid is near its solubility limit causes shrinkage of the droplets until the thermodynamically stable curvature is achieved. The emulsion turns from milky to transparent near this transition. Depending on the organic liquid and the lipoporphyrin, this should occur at a concentration between 10 times and 1/10 times the solubility limit of the organic liquid in water.

The selection of a suitable lipoporphyrin is guided by the need to for it to be both sufficiently hydrophilic and hydrophobic to reside in effective quantities at the oil/water interface. An effective quantity both stabilizes or assists in stabilizing the emulsion and serves as a photocatalyst for the formation of the Pt seeds in the region of the oil-water interface. A convenient method for achieving this is to incorporate substituents that have both a hydrophilic segment and a hydrophobic segment. Examples of suitable hydrophilic segments include but are not restricted to hydroxyl, amide, carboxyl, pyridyl, sulfonate, phosphate, amine, and other hydrophilic groups. Examples of suitable hydrophobic segments include but are not restricted to hydrocarbons containing 5 to 20 carbon atoms. For example, with SnP18, the substituent group is the N-octadecyl-pyridinyl group, where the octadecyl group acts as the hydrophobic tail while the pyridyl group has a positive charge and, along with the charged porphyrin ring system, is part of the hydrophilic head group.

Figure 3A:
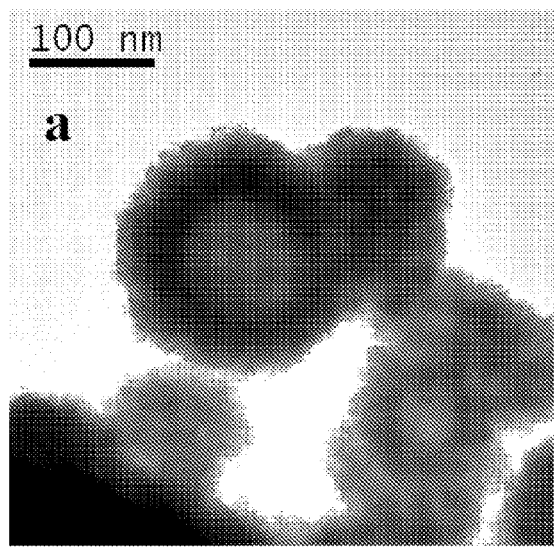
FIG. 3 presents transmission electron micrographs (TEMs) of Pt nanoshells prepared using 0.125 vol. % benzene in water emulsion stabilized by SnP18. The concentrations of FWD used for preparing the nanoshells are (a) 1 mM, (b) 0.5 mM, and (c) 0.25 mM.
Figure 3B:
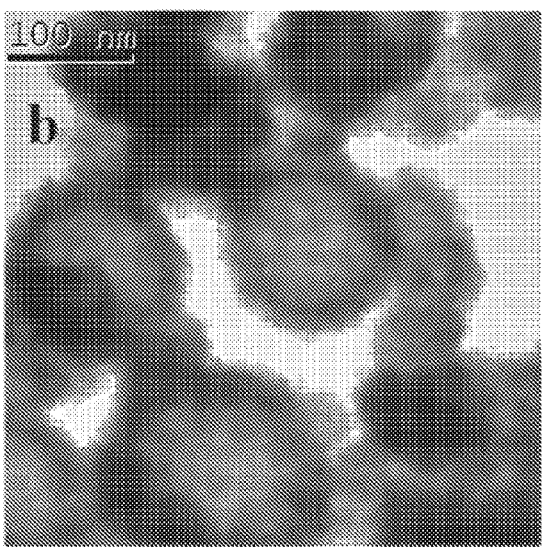
Figure 3C:
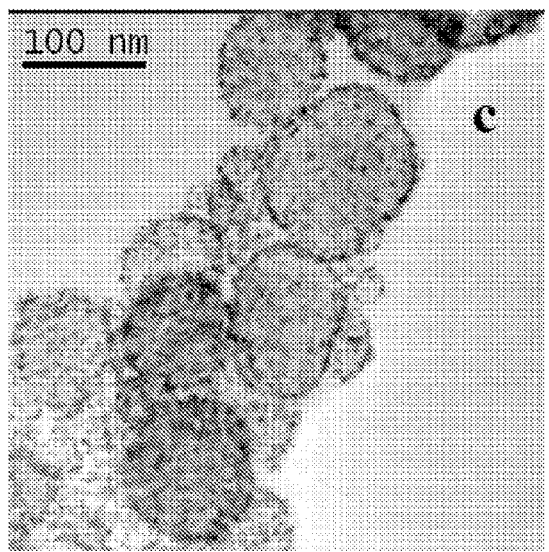

Shell thickness can be controlled by varying the Pt salt concentrations. In some embodiments, a 0.125 vol. % benzene/water emulsion was used with Pt(II) concentrations of 1.0 mM, 0.5 mM, and 0.25 mM Pt(II) ion concentrations. Nanoshells from these reactions are shown in FIGS. 3a, 3b, and 3c, respectively. The average wall thickness decreased form 40 nm to 20 nm when the initial Pt(II) concentration was decreased from 1 mM to 0.5 mM. The very thin Pt shell is visible in FIG. 3c for structures made from the low initial Pt(II) concentration of 0.25 mM.

The photocatalytic reduction seeding of platinum salts by the metallolipoporphyrin, as represented by the example SnP, is accomplished in the presence of visible light and an electron donor (ED) species. Suitable electron donor species include ascorbic acid, triethanolamine, ethylenediamine tetraacetic acid and the salts thereof, ethanol, and methanol. The SnP photoreaction is a reductive photocatalytic cycle, described by the following simplified equations:

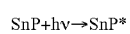

$$SnP + h\nu \rightarrow SnP^*$$

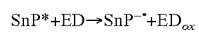

$$SnP^* + ED \rightarrow SnP^{-\cdot} + ED_{ox}$$

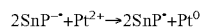

$$2SnP^{-\cdot} + Pt^{2+} \rightarrow 2SnP^{\cdot} + Pt^0$$

After it is produced, the Pt seed can serve as a catalyst and grow autocatalytically into the mature nanostructure. In some embodiments of this invention, the photocatalytic SnP molecules align on the emulsion droplet surface. The platinum seeds are produced at the oil-water interface through a photocatalytic process by exposing the droplets to light. The seeds can act as catalytic centers and a closed shell can be formed through an autocatalytic reaction mechanism. Continuing growth can increase the shell wall thickness, depending on the Pt(II) concentration for a particular reaction.

A very thin Pt shell, possibly formed in the photocatalytic stage followed by limited autocatalytic growth of Pt islands, is observed at low initial Pt(II) concentration (0.25 mM, FIG. 3c). Without the light exposure, the Pt(II) can be also reduced by an electron donor, such as, for example, ascorbic acid, but the reaction time is much longer and the products are much less uniform. The reaction without the photocatalytic porphyrin usually takes hours to produce visually detectable product, while only minutes are require using the photocatalyst. In addition, the platinum formed without the photocatalyst occurs as irregular aggregates instead of shells. Thus, the initial photocatalytic reduction at the oil-water interface of the droplet plays an important role in forming the shell structure.

Incorporation of an inclusion particle of a material that is solubilized in the organic liquid of the dispersed phase is part of some embodiments. One such embodiment is demonstrated in the formation of a magnetic nanoshell product using a porphyrin-stabilized emulsion. Particles of $Fe_3O_4$ were recovered from Ferrofluid to provide nanoparticles with surfaces modified to allow ready solubility in the organic phase. Other embodiments based on other particles (with or without bound solubilizer molecules) that are soluble in the dispersed organic phase can similarly be incorporated within the metal nanoshells or microshells formed by execution of this method. The magnetite nanoparticles contained in Ferrofluid were recovered by mixing 1 mL of Ferrofluid and 2 ml of benzene and adding 3 mL of ethanol to precipitate the magnetic particles. The mixture was centrifuged at 4000 rpm for 10 minutes, the supernatant was removed, and the precipitate was air-dried for approximately 20 minutes. The precipitate was re-suspended in 2 mL of benzene by mild sonication and 0.2 mL of the suspension was mixed with 0.2 mL of a suspension of SnP18 in benzene (3 mM SnP18). A 0.2 mL aliquot of this suspension (1.5 mM SnP18) was diluted with distilled water (20 mL) and sonicated to produce a 1 vol. % emulsion of benzene in water that was 15 µM SnP18. The magnetite-containing emulsion droplets were then used as nanoshell templates. Such core-shell nanostructures that contain a magnetic inclusion can be magnetically manipulated. This feature can be very useful for easy recovery for reuse of nanoshells that have been used as catalysts or for other applications.

A variety of inclusions may be employed in various embodiments of this invention. Many types of particles that are water insoluble but soluble in the organic liquid may be used. The size of the particle that may be included is determined in part by the emulsion droplet size. Nanoparticles size is largely determined by the inner volume of the droplet. Examples of suitable particles include but are not restricted to $Fe_3O_4$, $Fe_2O_3$, $TiO_2$, semiconductor quantum dots, Au particles, Ag particles, FePt particles, Ni particles, Co particles, and many alloyed particles where the particle is either inherently soluble in the organic liquid or is made soluble by surface modification with a material that facilitates solubilization. Organic dyes, organic fluorescent molecules, and other organic materials that are soluble in the organic liquid but minimally soluble in water may also be used as inclusions.

In some embodiments that are typical of photocatalytic platinum nanoshell synthesis, 2 mL of diluted emulsion solution was transferred to a reaction vial. A Pt (II) solution was prepared at a concentration of 20 mM by dissolving $K_2PtCl_4$ in water at room temperature and aging the mixture. In some embodiments, the mixture was aged for approximately one day before use. A volume of 0.15 M ascorbic acid solution was added to the emulsion solution. The pH of the reaction solution was approximately 3 due to the ascorbic acid. The concentration of Pt(II) in various embodiments was between 1 mM and 0.025 mM and the concentration of ascorbic acid was approximately 7.5 times that of Pt(II). The vial was irradiated with incandescent light (800 nmol/cm$^2$-sec) for approximately 30 min. The reaction solution turned gradually to a black suspension, which is evidence of the conversion of the Pt(II) in the solution to Pt atoms.

For the synthesis of magnetic platinum nanoshells in one embodiment, 20 mL of 1 vol. % magnetic benzene nanodroplets produced as described above was diluted with water (60 mL) to produce a template mixture containing approximately 0.25% benzene (3.7 µM SnP18). To this solution was added 3 mL of aged platinum complex (20 mM) and 3 mL of ascorbic acid (150 mM). The mixture was irradiated with incandescent light for approximately 40 minutes. The solution was centrifuged at 4000 rpm for approximately 10 minutes, and the supernatant liquid was removed. Distilled water (30 mL) was added to the centrifuge tube, and the precipitate was re-suspended. This purification procedure may be repeated.

For the synthesis of palladium nanoshells in one embodiment, an aqueous solution of 10 mM $K_2PdCl_4$ and 75 mM triethanolamine (TEA) was combined with a Pt-seeded emulsion. In one embodiment, 0.01 mL of 20 mM Pt(II) complex solution and 0.1 mL of 0.15 M ascorbic acid was combined with 2.0 mL of 0.5 vol. % chloroform (containing 1 mM SnP18) in water. The mixture was irradiated with light (800 nmol/cm$^2$-sec) for approximately 10 min to produce the Pt-seeded emulsion. Subsequently, 0.2 mL of the Pd(II)/TEA solution was added to the Pt-seeded emulsion. The yellow emulsion gradually turned black over the course of several minutes.

Figure 4:
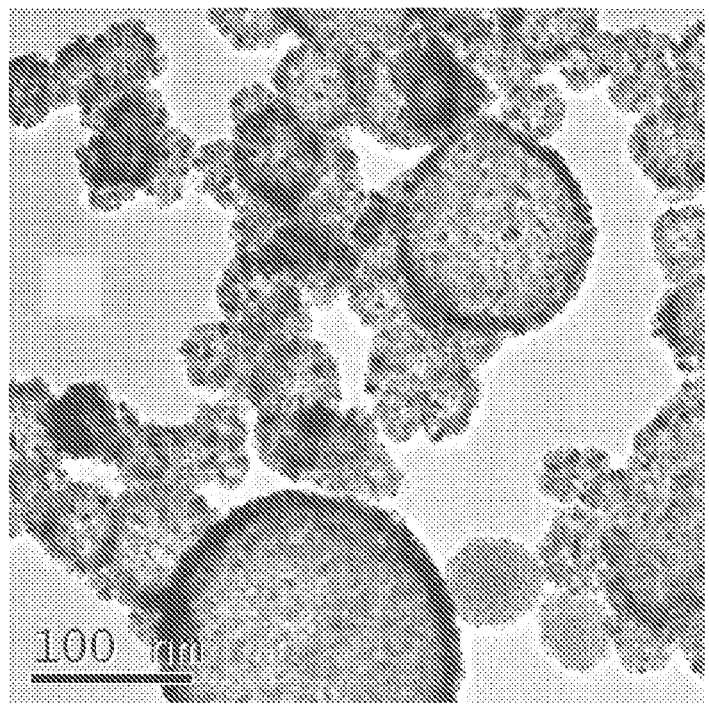
FIG. 4 presents a TEM of the mixture of Pd nanoshells and Pd dendrites made without Pt seeding using 0.5 vol. % chloroform in water emulsions stabilized by SnP18.

For formation of Pd-coated nanoshells as the predominant product, the presence of a Pt seed layer at the oil/water interface is desirable. The effect of preseeding with Pt and the effect of TEA in the formation of Pd nanoshells has been studied. With 2 mL of an emulsion of 0.5 vol % chloroform containing 1 mM SnP18, 0.01 mL of 20 mM Pt(II) and 0.1 mL of 0.15 M ascorbic acid were added and the solution was illuminated for 10 min. Addition of 0.2 mL of (0.75 mM TEA+10 mM Pd(II)) produced Pd nanoshells. If 0.1 mL of 0.2 M ascorbic acid and 0.2 mL of (0.75 mM TEA+10 mM Pd(II)) were added to the emulsion without Pt seeding, a mixture of Pd nanoshells and Pd dendrites formed. If 0.1 mL of 0.15 M ascorbic acid and 0.1 mL of 20 mM Pd(II) were added (no TEA stabilization), Pd dendrites instead of Pd shells were produced. FIG. 4 presents a transmission electron micrograph (TEM) of the unseeded TEA-stabilized case where both Pd nanoshells and Pd dendrites are produced.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for making metal nanoshells, the method comprising:
    forming an emulsion comprising lipoporphyrin-stabilized nanodroplets, wherein the emulsion comprises a photocatalytic lipoporphyrin, water, and an organic liquid wherein a concentration of the organic liquid is less than or equal to approximately an order of magnitude greater than a solubility limit of the organic liquid in water and wherein a solubility of the photocatalytic lipoporphyrin in water and a solubility of the photocatalytic lipoporphyrin in the organic liquid are sufficient to position the photocatalytic lipoporphyrin at a water/organic liquid interface of the lipoporphyrin-stabilized nanodroplets;

adding a seed metal ion and an electron donor species to the emulsion;

illuminating the emulsion with light of a wavelength that causes electronic excitation of the photocatalytic lipoporphyrin to form an excited photocatalytic lipoporphyrin;

reacting the excited photocatalytic lipoporphyrin with the electron donor species to form a reduced photocatalytic lipoporphyrin reducing the seed metal ion by reaction with the reduced photocatalytic lipoporphyrin to form a seed metal nanoparticle at the water/organic liquid interface;

adding a shell metal ion to the emulsion; and reducing the shell metal ion catalytically using the seed metal nanoparticle to form a metallic nanoshell.

2. The method of claim 1, wherein the photocatalytic lipoporphyrin is a metalloporphyrin comprising a hydrophilic head and a hydrophobic tail.

3. The method of claim 2, wherein the hydrophilic head comprises a hydrophilic substituent segment selected from the group consisting of a hydroxyl group, an amide group, a carboxyl group, a pyridyl group, a sulfonate group, a phosphate group, and an amine group, and wherein the hydrophobic tail comprise a hydrocarbon moiety containing between 5 and 20 carbon atoms.

4. The method of claim 1, wherein the photocatalytic lipoporphyrin is a metalloporphyrin selected from the group consisting of a tin(IV) lipoporphyrin and tin(IV) meso-tetra (N-octadecyl-4-pyridyl)porphyrin chloride.

5. The method of claim 1, wherein the electron donor species is selected from a group consisting of ascorbic acid, triethanolamine, ethylenediamine tetraacetic acid and the salts thereof, methanol, and ethanol.

6. The method of claim 1, wherein the seed metal ion is Pt.

7. The method of claim 1, wherein the shell metal is selected from the group consisting of Pt, Pd, Au, and Ag.

8. The method of claim 1, wherein the organic liquid has a solubility in water suitable for forming an emulsion that is stable for a time required to form the metallic nanoshell.

9. The method of claim 1, wherein the organic liquid is selected from the group consisting of benzene, chloroform, dichloromethane.

10. The method of claim 1, the step of forming the emulsion further comprising incorporating an inclusion particle in a droplet of the emulsion.

11. The method of claim 10, wherein the inclusion particle is selected from the group consisting essentially of $Fe_3O_4$, $Fe_2O_3$, $TiO_2$, Au, Ag, FePt, Ni, Co, semiconductor quantum dots, metal particles, metal alloy particles, and solubilized versions thereof made soluble by surface modification with a material that facilitates solubilization.

12. The method of claim 1, further comprising
collecting the metallic nanoshell;
suspending the metallic nanoshell in an aqueous solution comprising a second shell metal ion and a second electron donor species;
reducing the second shell metal ion on the metallic nanoshell to form a layered metallic nanoshell.

* * * * *